(12) United States Patent
Park et al.

(10) Patent No.: US 10,871,301 B2
(45) Date of Patent: Dec. 22, 2020

(54) AIR CONDITIONER AND CONTROL METHOD THEREOF

(71) Applicant: LG ELECTRONICS INC., Seoul (KR)

(72) Inventors: Chulmin Park, Seoul (KR); Sangwoo Lee, Seoul (KR); Juntae Kim, Seoul (KR); Kwonhyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/862,825

(22) Filed: Jan. 5, 2018

(65) Prior Publication Data

US 2018/0202682 A1    Jul. 19, 2018

(30) Foreign Application Priority Data

Jan. 5, 2017  (KR) .................. 10-2017-0002058

(51) Int. Cl.
*F24F 11/56*        (2018.01)
*F16C 32/04*        (2006.01)
(Continued)

(52) U.S. Cl.
CPC .......... *F24F 11/56* (2018.01); *F16C 32/0442* (2013.01); *F16C 32/0444* (2013.01);
(Continued)

(58) Field of Classification Search
None
See application file for complete search history.

(56) References Cited

U.S. PATENT DOCUMENTS

| 5,499,510 A | * | 3/1996 | Yoshida | .................. | F24F 3/065 165/205 |
| 5,630,324 A | * | 5/1997 | Yoshida | .................. | F24F 3/065 62/175 |

(Continued)

FOREIGN PATENT DOCUMENTS

| EP | 2 239 519 | 10/2010 |
| JP | 5943678 | 7/2016 |

(Continued)

OTHER PUBLICATIONS

Korean Office Action dated Apr. 16, 2018 issued in Application No. 10-2017-0002058.

(Continued)

*Primary Examiner* — Santosh R Poudel
(74) *Attorney, Agent, or Firm* — KED & Associates LLP (57) ABSTRACT

Disclosed is an air conditioner and a control method thereof, the air conditioner where a plurality of units is connected wirelessly to receive and transmit data with each other, and the control method in which an address is set in a wireless communication method using an initially set basic channel, a group is set in response to a response signal, and communication is performed with an indoor unit belonging into the same group through a new channel. Accordingly, the plurality of units in the air conditioner is able to receive and transmit data with each other wirelessly, and a group is set with respect to multiple units so that the multiple units are able to communicate with each other directly. Additionally, because a group is able to be easily set with respected to units connected via a pipe by setting a channel, it is possible to reduce a time for setting wireless communication and make the communication setting accurate. The present disclosure allows units to communicate using a different channel according to which group each unit belongs to, thereby (Continued)

preventing intervention between groups and malfunction of units.

17 Claims, 7 Drawing Sheets

(51) Int. Cl.
| | |
|---|---|
| *F24F 11/58* | (2018.01) |
| *F24F 11/48* | (2018.01) |
| *F24F 11/62* | (2018.01) |
| *F24F 11/49* | (2018.01) |
| *F24F 11/65* | (2018.01) |
| *F24F 11/54* | (2018.01) |
| *F24F 1/32* | (2011.01) |
| *G05B 15/02* | (2006.01) |
| *F24F 110/10* | (2018.01) |

(52) U.S. Cl.
CPC ...... *F16C 32/0451* (2013.01); *F16C 32/0457* (2013.01); *F24F 1/32* (2013.01); *F24F 11/48* (2018.01); *F24F 11/49* (2018.01); *F24F 11/54* (2018.01); *F24F 11/58* (2018.01); *F24F 11/62* (2018.01); *F24F 11/65* (2018.01); *G05B 15/02* (2013.01); *F24F 2110/10* (2018.01)

(56) References Cited

U.S. PATENT DOCUMENTS

| | | | |
|---|---|---|---|
| 8,781,634 B2* | 7/2014 | Kim | F24F 11/30 |
| | | | 700/276 |
| 2001/0022089 A1* | 9/2001 | Wada | G05B 19/0421 |
| | | | 62/126 |
| 2009/0139251 A1 | 6/2009 | Masui | |
| 2009/0145147 A1* | 6/2009 | Kojima | F24F 1/0003 |
| | | | 62/157 |
| 2010/0027493 A1* | 2/2010 | Dinulescu | H04W 72/02 |
| | | | 370/329 |
| 2010/0198415 A1* | 8/2010 | Kawano | F25B 13/00 |
| | | | 700/282 |
| 2010/0319362 A1* | 12/2010 | Hisaoka | F25B 13/00 |
| | | | 62/56 |
| 2013/0298576 A1* | 11/2013 | Kim | F24F 1/0003 |
| | | | 62/56 |
| 2014/0192723 A1* | 7/2014 | Schenk | H04W 84/18 |
| | | | 370/328 |
| 2014/0372774 A1* | 12/2014 | Li | G06F 1/26 |
| | | | 713/300 |
| 2015/0142176 A1* | 5/2015 | Senba | G05B 15/02 |
| | | | 700/275 |
| 2015/0230283 A1 | 8/2015 | Li et al. | |
| 2015/0323207 A1 | 11/2015 | Son et al. | |
| 2016/0215996 A1* | 7/2016 | Blair | G08B 21/187 |

FOREIGN PATENT DOCUMENTS

| | | |
|---|---|---|
| KR | 10-2013-0037116 | 4/2013 |
| KR | 10-2013-0045747 | 5/2013 |
| KR | 10-2016-0108826 | 9/2016 |
| KR | 10-1658495 | 9/2016 |

OTHER PUBLICATIONS

PCT Search Report dated May 1, 2018 issued in Application No. PCT/KR2018/000233.

European Search Report dated May 24, 2018 in Application No. 18150413.5.

* cited by examiner

AIR CONDITIONER AND CONTROL METHOD THEREOF

CROSS-REFERENCE TO RELATED APPLICATION

This application claims priority under 35 U.S.C. § 119 to Korean Application No. 10-2017-0002058 filed on Jan. 5, 2017, whose entire disclosure is hereby incorporated by reference.

BACKGROUND

1. Field

The present disclosure relates to an air conditioner and a control method thereof and, more particularly, to an air conditioner which sets groups composed of multiple units, and a control method thereof.

2. Background

An air conditioner is installed to provide a comfortable indoor environment to humans by discharging cold air to a room to adjust an indoor temperature and purify the air of the room to create a pleasant indoor environment. Generally, the air conditioner includes an indoor unit which includes: an indoor unit composed of a heat exchanger and installed indoor; and an outdoor unit composed of a compressor and a heat exchanger and configured to supply a refrigerant to the indoor.

The indoor unit and the outdoor unit in the air conditioner are controlled separately and individually. The outdoor unit and the indoor unit are connected via a refrigerant pipe, so that a refrigerant compressed by the compressor of the outdoor unit is supplied to the heat exchanger of the indoor unit and then the refrigerant heat-exchanged in the heat exchanger of the indoor unit flows into the compressor of the outdoor unit via the refrigerant pipe. Accordingly, the indoor unit discharges cool air through heat exchange using the refrigerant.

In the air conditioner, the indoor unit and the outdoor unit receive and transmit data with respect to each other and even a connected control device performs communication with the outdoor unit or the indoor unit. As being connected to the control device via a communication line, indoor unit or the outdoor unit may communicate with the controller according to a connection method of the communication line. In the case where the control device and the outdoor unit communicate with each other, the control device receives data about the indoor unit through the outdoor unit.

In the air conditioner, the indoor unit and the outdoor unit are connected via the communication line to receive and transmit data with respect to each other. However, when such a communication line is used, establishing initial communication takes a long time, and, if wrong connection is made, the indoor unit may malfunction.

To address this drawback, the control device and the indoor unit may be connected using wireless communication, not using wired communication, but wireless communication should be set manually at the initial setting procedure.

In addition, equipment for setting wireless communication is required.

Manually setting communication requires a great amount of time because a technician needs to set each and every detail for communication. In addition, if the technician makes any mistake, the communication may become disabled or intervention may be caused in communication with a different unit.

BRIEF DESCRIPTION OF THE DRAWINGS

The embodiments will be described in detail with reference to the following drawings in which like reference numerals refer to like elements wherein.

DETAILED DESCRIPTION

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and thorough understanding of the present invention to those skilled in the art. The scope of the present invention is defined only by the claims. Like reference numerals indicate like elements throughout the specification and drawings. In addition, it is apparent that a controller and any other unit in an air conditioner described herein can be implemented as one or more processors and as a hardware device.

Figure 1:
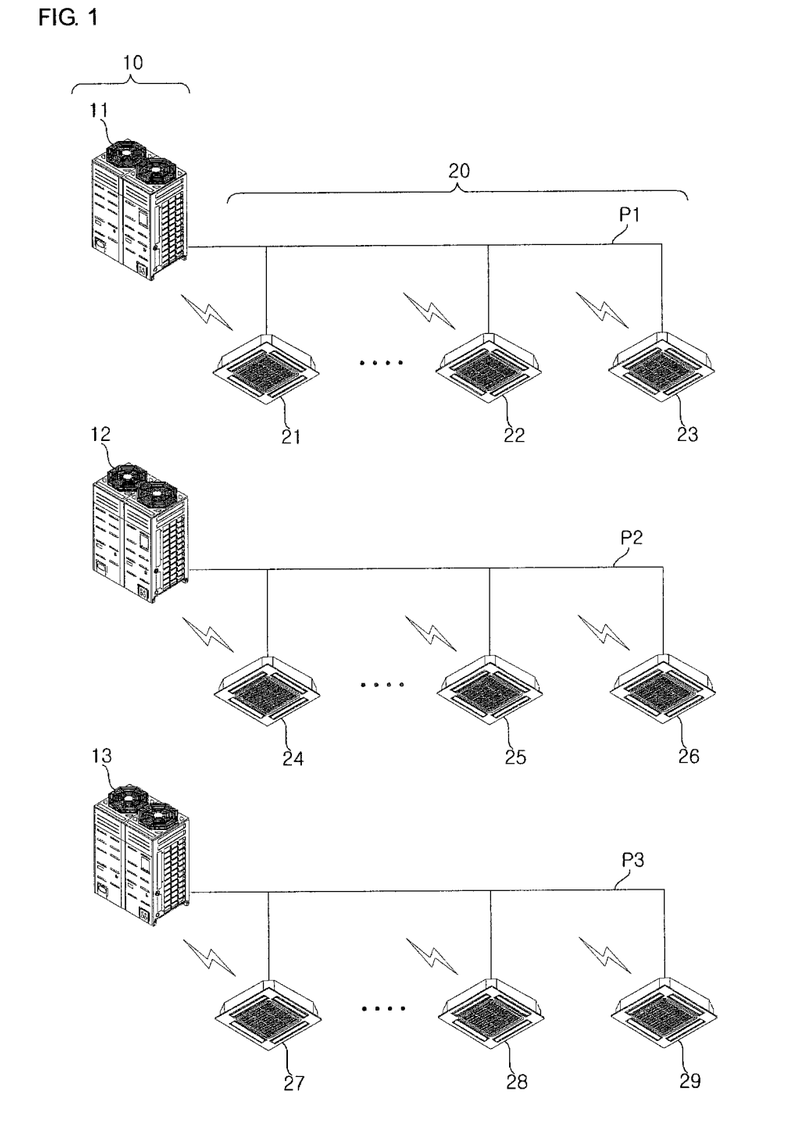
FIG. 1 is a diagram illustrating a configuration of an air conditioner according to an embodiment of the present disclosure.

FIG. 1 is a diagram illustrating a configuration of an air conditioner according to an embodiment of the present disclosure.

As illustrated in FIG. 1, an air conditioner includes a plurality of indoor units 20, and a plurality of outdoor units 10 connected to at least one of the plurality of indoor units 20.

In this specification, an example in which an air conditioner includes the plurality of outdoor units 10 and the plurality of indoor units 20 is described. However, the air conditioner may further include at least one of a ventilation unit, an air purifier, a humidifier, and a heater, and those units may operate interlinking with the indoor units and the outdoor units.

The air conditioner may further include a remote controller (not shown) connected to the plurality of indoor units, and the plurality of outdoor units may be connected to a control device (not shown) which controls and monitors the air conditioner. When connected to the control device, first to third outdoor units 11 to 13 may be respectively connected to outdoor units to operate individually while the first to third outdoor units 11 to 13 are connected to the outdoor units through the control device. In addition, the air conditioner may be connected to an external server (not shown), and may be connected to a mobile terminal (not shown) which is accessing from a remote area.

The control device controls operation of the plurality of indoor units 20 and the plurality of outdoor units 10 in response to an input user command, periodically receives and stores data about corresponding operation states of the plurality of indoor units 20 and the plurality of outdoor units 10, and outputs the operational states through a monitoring screen. The control device may be connected to the plurality of indoor units 20 so as to set operations, lock, control schedules, control peak power consumption, and control a demand with respect to the plurality of indoor units 20. In addition, the control device may be implemented as a plurality of center control devices which is connected to one another or connected over a certain network.

The remote controller (not shown) is connected to an indoor unit in a wired or wireless manner so as to input a user command to the indoor unit, receive data from the indoor unit, and output the data. The remote controller may transmit a user commands to the indoor unit according to a method of connection with the indoor unit. In addition, the remote controller may perform one-directional communication in which the remote controller does not receive data from the indoor unit, or may perform two-directional communication in which the remote controller receives and transmits data with respect to the indoor unit.

The plurality of outdoor units 10 may be respectively connected to the plurality of indoor units 20 so as to supply refrigerants to the plurality of indoor units 20.

The first outdoor unit 11 is connected to first to third indoor units 21 to 23 via a first refrigerant pipe P1; the second outdoor unit 12 is connected to fourth to sixth indoor units 24 to 26 via a second refrigerant pipe P2, and the third outdoor unit 13 is connected to seventh to ninth indoor units 27 to 29 via a third refrigerant pipe P3.

Upon operation of the first outdoor unit 11, refrigerants are supplied from the first outdoor unit 11 to the first to third indoor units 21 to 23 via the first refrigerant pipe P1. Upon operation of the second outdoor unit 12, refrigerants are supplied to the fourth to sixth indoor units 24 to 26 via the second refrigerant pipe P2 and supplied from the third outdoor unit 13 to the seventh to ninth indoor units 27 to 29 via the third refrigerant pipe P3.

At this point, the air conditioner operates in a manner such that the plurality of outdoor units 10 periodically communicates with the plurality of indoor units 20 to receive and transmit data and changes operation according to operation settings which is changed by the plurality of indoor units 20. The plurality of outdoor units and the plurality of indoor units receive and transmit data in a wireless communication method.

Accordingly, the air conditioner sets groups by grouping an outdoor unit and an indoor unit connected via a refrigerant pipe, and allows the outdoor unit and the indoor unit to receive and transmit data within the group. The air conditioner may set a group on a unit basis of outdoor unit, and each group performs communication using a different channel.

Before setting groups, the air conditioner makes indoor and outdoor units to use the same basic channel, sequentially sets groups on a unit basis of outdoor unit, and allocates a channel different from the basic channel to a set group. Accordingly, when a plurality of groups is set in the air conditioner, each group performs communication using the newly allocated channel.

For convenience of explanation, an example in which three indoor units are connected to each outdoor unit is described, but it is merely exemplary and the number and the form of the indoor units are not limited thereto.

The plurality of indoor units 20 includes: an electric expansion valve (not shown) which expands a refrigerant supplied from an outdoor unit 10; an indoor heat exchanger (not shown) which exchanges heat with a refrigerant; an indoor fan (not shown) which allows indoor air into the indoor heat exchanger and exposes the heat-exchanged air to the indoor; and a plurality of sensors (not shown), and a control means (not shown) which controls operation of a corresponding indoor unit.

In addition, the plurality of indoor units 20 includes a discharge port (not shown) through which heat-exchanged air is discharged, and the discharge port includes a wind direction adjusting means (not shown) which opens and closes the discharge port and controls a direction in which air is discharged. The plurality of indoor units 20 controls a rotation speed of the indoor fan so as to control air to be intake or discharged and to adjust an air flow. The plurality of indoor units 20 may further include an output unit which displays an operation state thereof and setting information, and an input unit which enables inputting setting data. At this point, the plurality of indoor units 20 may transmit setting information about operation of the air conditioner to the remote controller 20, output the setting information through the remote controller 20, and receive data.

The plurality of outdoor units 10 operates in a cooling mode or a heating mode in response to data received from an indoor unit 20 that is connected thereto or a control command of the control device, and supplies refrigerants to the indoor unit 20 connected thereto.

When a plurality of outdoor units is connected, each outdoor unit may be connected to a plurality of indoor units and supply refrigerants to the plurality of indoor units through a distributor.

The plurality of outdoor units includes: at least one compressor which compresses refrigerants to discharge highly-pressured vapor refrigerants; an accumulator which separates the refrigerants into vapor refrigerants and liquid refrigerants to prevent non-vaporized liquid refrigerant from flowing into the compressor; an oil recovery device which recovers oil from a refrigerant discharged from the compressor; an outdoor heat exchanger which compresses or evaporates a refrigerant by exchanging heat with outdoor air; an outdoor fan which allows air to flow into the outdoor heat exchanger and discharges heat-exchanged air to the outside so that the outdoor heat exchanger exchanges heat more smoothly; a four-way valve which changes a refrigerant path according to an operation mode of an outdoor unit; at least one pressure sensor which measures pressure; at least one temperature sensor which measure temperature; and a control component which controls operation of an outdoor unit and communicates with other units. The plurality of outdoor unit 10 further includes a plurality of sensors, a plurality of valves, a plurality of super cooling devices, etc. but description thereof will be emitted herein.

Figure 2:
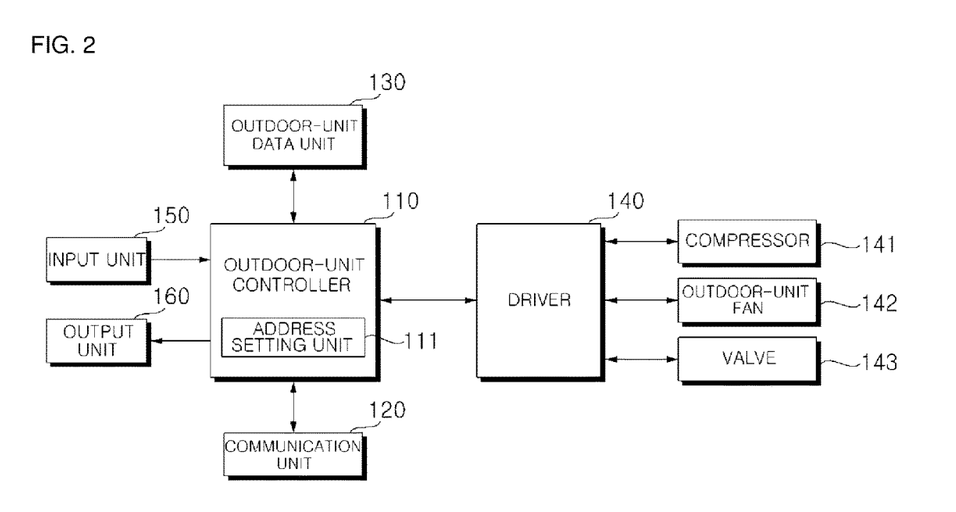
FIG. 2 is a block diagram schematically illustrating a configuration of an outdoor unit in an air conditioner according to an embodiment of the present invention.

FIG. 2 is a block diagram schematically illustrating a configuration of an outdoor unit in an air conditioner according to an embodiment of the present invention.

As illustrated in FIG. 2, each of the plurality of outdoor units 10 includes a driver 140, a compressor 141, an outdoor-unit fan 142, a valve 143, a communication unit 120, an output unit 160, an input unit 150, an outdoor-unit data unit 130, and an outdoor-unit controller 110 which controls overall operation of a corresponding outdoor unit.

The outdoor unit data unit 130 stores: control data for controlling operation of the compressor 141, the outdoor-unit fan 142, and the valve 143; communication data for communicating with an indoor unit or the control device; data transmitted and received with respect to the outside; and operation data which occurs or is detected during operation.

In addition, the outdoor-unit data unit 130 stores addresses respectively allocated to a plurality of indoor units, and information about group settings.

The outdoor-unit data unit 130 stores an execution program for each function of an outdoor unit, data required for operation control, and transmitted and received data. The outdoor-unit data unit 130 may be any of various hardware storage devices, such as ROMs, RAMs, EPROMs, flash drives, and hard drives.

The input unit 150 may further include at least one of a button, a switch, and a touch input means, and input a user command or specific data into an outdoor unit. For example, a power key, a test key, and an address setting key.

The output unit 160 may include at least one of a lamp which is controlled to be turned on or flash, a speaker, and a display unit so as to output an operation state of the outdoor unit. By being turned on or flashing or with a turned-on color, the lamp notifies whether the outdoor unit is in operation. The speaker outputs an operation state of the outdoor unit by outputting a specific alarm or effect sound. The display unit may output operation settings or operation states of the output unit in the form of a guidance message or a warning with a combination of at least one of a text, a number, and an image.

The driver 140 supplies operating power to a control target in accordance with a control command of the outdoor-unit controller 110, and then controls driving of the control target. The driver 140 is depicted as controlling all of the compressor 141, the outdoor-unit fan 142, and the valve 143: however, there may be a compressor driver, a fan driver, and a valve controller to control the compressor 141, the outdoor-unit fan 142, and the valve 143, respectively.

The driver 140 applies operating power to respective motors of the compressor 141, the outdoor-unit fan 142, and the valve 143, so that the compressor 141, the outdoor-unit fan 142, and the valve 143 perform designated operations upon operation of the respective motors.

The outdoor-unit fan 142 supplies outdoor air to the outdoor heat exchanger through rotation operation of a fan, and discharges heat-exchanged cold air to the outside. The outdoor heat exchanger 142 operates as a condenser in the cooling mode and as an evaporator in the heating mode, and thus, the outdoor-unit fan 142 discharges cool air or hot air which is heat-exchanged in the outdoor heat exchanger.

A degree of opening or closing of the valve 142 is adjusted by the driver 140 so as to control a refrigerant flow or a direction of the refrigerant flow. A plurality of valves 143 is positioned at different locations, and thus, there may be a plurality of valve drivers. The valve 143 includes a four-way valve, an expansion valve, a hot gas valve, etc.

The compressor 141 compresses inflowing refrigerants and discharges the compressed refrigerants, thereby allowing refrigerants to circulate from an outdoor unit to an indoor unit. Once a low-temperature and low-pressure vapor refrigerant inflows, the compressor 141 compresses the refrigerant to discharge a high-temperature and high-pressure vapor refrigerant. An operation frequency of the compressor 141 is adjusted by an inverter which is provided in the driver 140.

The communication unit 120 communicates with another outdoor unit or a connected indoor unit in accordance with a control command from the outdoor controller 110. In addition, the communication unit 120 communicates with the control device to receive and transmit operation data, receives a control command from the control device, and transmits the received control command to the controller 110.

The communication unit 120 communicates with a plurality of indoor units in a wireless communication method. For example, the communication unit 120 may include Zigbee, WiFi, and Bluetooth.

The outdoor unit controller 110 controls data which is input and output through an input unit and an output unit, manages data stored in the outdoor-unit data unit 130, and controls receiving and transmitting of data through the communication unit 120.

The outdoor-unit controller 110 generates a control command to require operation in accordance with a request from an indoor unit or operation settings. The outdoor-unit controller 110 applies the generated control command to the driver 140 so that the compressor, the outdoor-unit fan 142, and the valve 143 operate. In response to data which is input from a plurality of sensors (not shown) during operation of the outdoor unit, the outdoor unit controller 110 determines an operation state of the outdoor unit, determines abnormality, and then outputs an error.

In addition, the outdoor-unit controller 110 includes an address setting unit 111.

At the initial connection, the address setting unit 111 of the outdoor-unit controller 110 searches for at least one indoor unit connected via a refrigerant pipe and sets a group. The address setting unit 111 may transmit an address setting signal through the communication unit 120, and set a group with respect to an indoor unit from which a response signal is received.

Once an address setting command is input, the outdoor-unit controller 110 operates in a manner such that the address setting unit 111 starts to set groups using the basic channel and sets a group composed of at least one indoor unit when a response signal is received from an indoor unit. When setting the group, the address setting unit 111 allocates an address to the indoor unit and a new channel different from the basic channel to the group so that the group is able to communicate with the indoor unit through the new channel.

The outdoor unit controller 110 stores the set group and the address allocated to the indoor unit in the outdoor-unit data unit 130.

If one of a plurality of outdoor units is performing a group setting procedure, the rest of the outdoor units remain in the idle state. The rest of plurality of outdoor units performs a group setting procedure according to a state of one of the plurality of outdoor units. For example, if a first outdoor unit transmits an address setting signal, another outdoor unit is using the basic channel, and therefore, it is determined that group setting is being performed by the first outdoor unit so another outdoor unit remains in the idle state.

When an address is allocated to an indoor unit by the address setting unit 111 and a group is set, the outdoor-unit controller 110 communicates with the indoor unit through the communication unit 120.

In the case of setting a group and changing a channel, the outdoor-unit controller 110 transmits channel information to an outdoor unit and requests a channel change. The outdoor-unit controller 110 finishes the address setting procedure and communicates with the indoor unit using the newly allocated channel. At this point, the outdoor unit controller 110 may generate a signal indicative of completion of the address setting procedure, and transmit the signal to the communication unit 120.

In addition, in the case where the outdoor-unit controller 110 remains in the idle state because of a group setting procedure is being performed by a different outdoor unit, if the group setting procedure of the different outdoor unit is finished, the outdoor-unit controller 110 may start to set a group.

Figure 3:
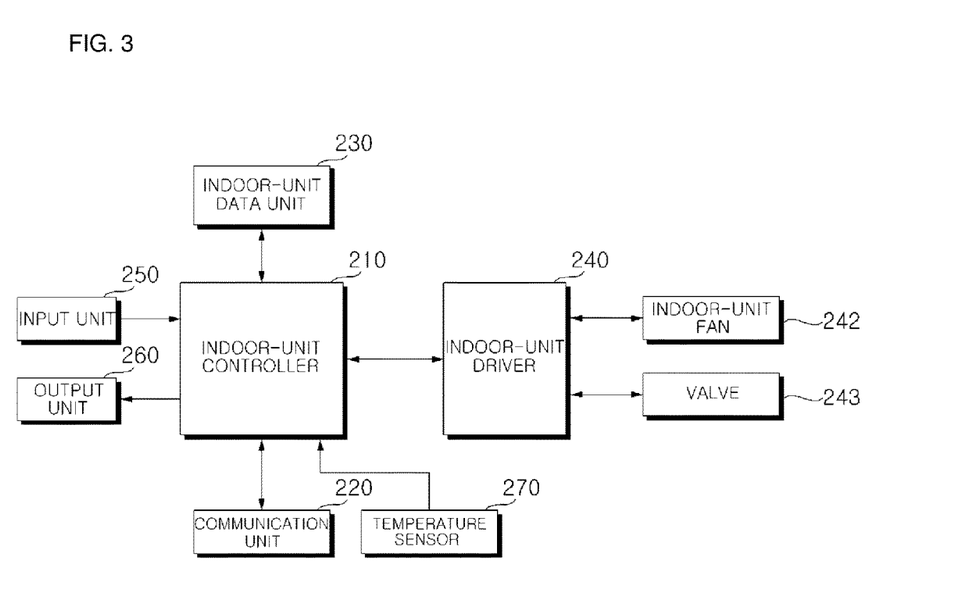
FIG. 3 is a block diagram schematically illustrating a configuration of an indoor unit in an air conditioner according to an embodiment of the present disclosure.

FIG. 3 is a block diagram schematically illustrating a configuration of an indoor unit in an air conditioner according to an embodiment of the present disclosure.

As illustrated in FIG. 3, each of the plurality of indoor units 20 may include an indoor-unit data unit 230, an input unit 250, an output unit 260, a communication unit 220, an indoor-unit driver 240, an indoor-unit fan 242, a valve 243, and an indoor-unit controller 210 for controlling overall operation of a corresponding indoor unit.

The indoor-unit data unit 230 stores control data for controlling the corresponding indoor unit, data about a plurality of operations set in the indoor unit, and data about an operation mode set in the input unit 250. The indoor-unit data unit 230 may store data received from an outdoor unit or another indoor unit, and data required for communication with another indoor unit or the outdoor unit, such as address information and channel information allocated by the outdoor unit. The indoor-unit data unit 230 may be any of various hardware storage devices, such as ROMs, RAMs, EPROMs, flash drives, and hard drives.

The input unit 250 includes at least one of a button, a switch, and a touch input means so as to input a user command or specific data. For example, a power key, a menu input key, an operation setting key, a temperature adjustment key, an airflow key, a lock key, etc. may be provided.

The output unit 260 may include at least one of a lamp which is controlled to be turned on or flash, a speaker, and a display unit so as to output data about the outdoor unit or an indoor unit based on an operation state of the control device or received data. By being turned on or flashing or with a turned-on color, the lamp notifies an operation state or communication state of the control device. The speaker outputs a specific alarm or effect sound. In addition, the display unit may output a menu screen for controlling the outdoor unit and the indoor unit, and output operation settings of an operation state in the form of a guidance message or a warning with a combination of at least one of a text, a number, and an image.

The communication unit 220 communicates with the outdoor unit and another indoor unit based on a stored address and stored channel information. The communication unit 220 includes a plurality of communication modules, and uses the same or different communication module when communicating with an outdoor/indoor unit, a remote controller, or the control device. For example, according to a configuration of the air conditioner, the communication unit 220 may include a short range communication module, such as NFC and Bluetooth, and a wireless communication module, such as Wi-Fi.

The indoor-unit driver 240 controls the indoor-unit fan 242 and the valve 243 in response to a control command of the indoor unit controller 210. The indoor-unit driver 240 applies operating power to the indoor-unit fan 242, and controls driving and a rotation speed of the indoor-unit fan 242. In addition, the indoor-unit driver 240 controls opening/closing of the valve 243 and a degree of openness of the valve 243. The indoor-unit driver 240 may be separated into a fan driver for controlling the indoor-unit fan 242, and a valve controller for controlling the valve 243.

The temperature sensor 270 may be implemented as a plurality of temperature sensors, which detects indoor temperature, temperature in an indoor heat exchanger, and temperature in a pipe and inputs data about the detection to the indoor-unit controller 210.

The indoor-unit controller 210 sets operations according to operation settings set by the input unit 250 or a remote controller, enables transmitting data to the outdoor unit through the communication unit 220, and enables outputting data, received from the outdoor unit, through the output unit 260.

The indoor-unit controller 210 allows detected data and transmitted and received data to be stored in the indoor-unit data unit 230, analyze received data through the communication unit 220, and controls the indoor unit to operate according to the analysis result.

Once address setting starts by the outdoor unit, the indoor-unit controller 210 controls the indoor-unit driver 240 so that the corresponding indoor unit performs a designated operation. In addition, upon the operation of the indoor unit, the indoor unit controller 210 analyzes pipe temperature, heat exchanger temperature, or indoor temperature measured by a temperature sensor, and determines temperature change.

After the corresponding indoor unit has operated for a predetermined hour since address setting started, the indoor unit controller 210 calculates a change in temperature. If the change in temperature is equal to or greater than a set value, the indoor unit controller 210 generates a response signal for the outdoor unit and applies the response signal to the communication unit 220. Accordingly, the communication unit 120 transmits the response signal to the outdoor unit.

In addition, when an address is allocated by the outdoor unit through the communication unit 220 and channel information is received, the indoor-unit controller 210 stores address information and the channel information in the indoor-unit data unit 230 and then controls the communication unit 220 to change a communication channel based on the channel information. Accordingly, the communication unit 220 starts to perform communication through a changed channel.

Figure 4:
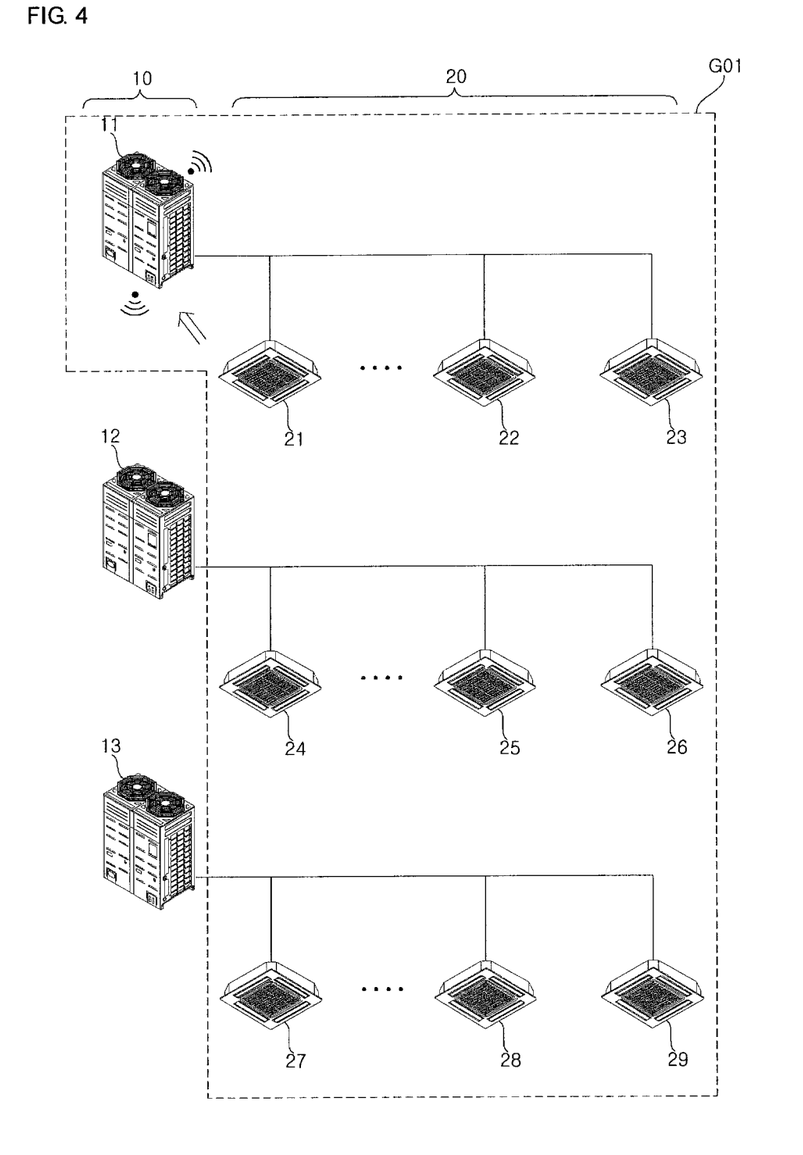
FIG. 4 is a diagram for explaining a procedure for initial channel setting between an outdoor unit and an indoor unit by an air conditioner according to an embodiment of the present disclosure.

FIG. 4 is a diagram for explaining a procedure of initial channel setting between an outdoor unit and an indoor unit by an air conditioner according to an embodiment of the present disclosure.

As illustrated in FIG. 4, before a group setting procedure is performed, the same basic channel is set for the plurality of outdoor units 10 and the plurality of indoor units 20, and thus, the plurality of outdoor units 10 and the plurality of indoor units 20 are able to communicate using the basic channel.

When the first outdoor unit 11 transmits a signal, all devices using the same basic channels, that is, the first to ninth indoor units 21 to 29, receive the signal from the first outdoor unit.

At this point, even the second outdoor unit 12 and the third outdoor unit 13 are able to receive the signal since the basic channel is set; however, operation of the second outdoor unit 12 and the third outdoor unit 13 has stopped and thus the second outdoor unit 12 and the third outdoor unit 13 do not receive the signal.

When being in the idle state, the second outdoor unit 12 and the third outdoor unit 13 receive the signal but do not response because the signal is from the first outdoor unit 11.

The first outdoor unit 11 transmits an address setting signal through the basic channel, and every indoor unit in a basic group G01 using the basic channel receives the address setting signal from the first outdoor unit 11.

At this point, the basic group represents a state before group setting, that is, a state in which every indoor unit belongs to the same group using the same basic channel.

The first to ninth indoor units start to operate in accordance with the address setting signal from the first outdoor unit 11. After a predetermined period of time since the first to ninth indoor units started to operate, the first to ninth indoor units determines whether there is a change in temperature. If there is a change in temperature, especially if the change in temperature is equal to or greater than a set value, each indoor unit generates a response signal and transmits the response signal through the basic channel.

At this point, since addresses are not set in the state of the basic group, outdoor units and indoor units broadcast signals. One indoor unit broadcasts a response signal, and another indoor unit is able to receive the response signal but abandons the received signal because the signal is meant to be sent to the outdoor unit. Meanwhile, the first outdoor unit receives a response signal from the indoor unit, determines which indoor unit has transmitted the response signal, and allocates an address to the corresponding indoor unit from which the response signal is received.

If the first outdoor unit is in operation, refrigerants are supplied to the first to third indoor units connected via a refrigerants pipe of the first outdoor unit, and thus, temperature in the first to third indoor units is changed. At this point, the change in temperature may be selectively one of indoor temperature, refrigerant pipe temperature, and heat exchanger temperature.

Meanwhile, even when the fourth ninth indoor units receives a signal and starts to operate, refrigerants are not supplied to the fourth to ninth indoor units, and thus, there is no change in temperature in the fourth to ninth indoor units.

Accordingly, the first to third indoor units transmits response signals to the first outdoor unit.

When the response signals are received, the first outdoor unit transmits an operation stop command to the first to third indoor units so that the first to third indoor units stop operating.

The first outdoor unit allocates addresses to the first to third indoor units from which the response signals are received.

In addition, the first outdoor unit searches for a new channel and sets the currently not-used channel, for example, a first channel, as a channel for a group. Using the allocated addresses, the first outdoor unit transmits channel information about a new channel, that is, the first channel, to the first to third indoor units, and requests a channel change.

The first to third indoor units set the new channel in response to the request for channel change from the first outdoor unit, and perform communication with the first outdoor unit.

Accordingly, the first outdoor unit and the first to third indoor units use the first channel, not the basic channel, and thus, they are excluded from the basic group.

The first outdoor unit transmits data through the first channel, and the transmitted data is transmitted to the first to third indoor units which use the same channel. Accordingly, the first indoor unit and the first to third indoor units make up a first group.

When an address allocating and group setting procedure is complete, the first outdoor unit stops operating. In some cases, the first outdoor unit may transmit a setting completion signal to another outdoor unit which is in the idle state.

Then, the second outdoor unit and the third outdoor unit operate sequentially and perform address setting in the same manner as described above.

Figure 5:
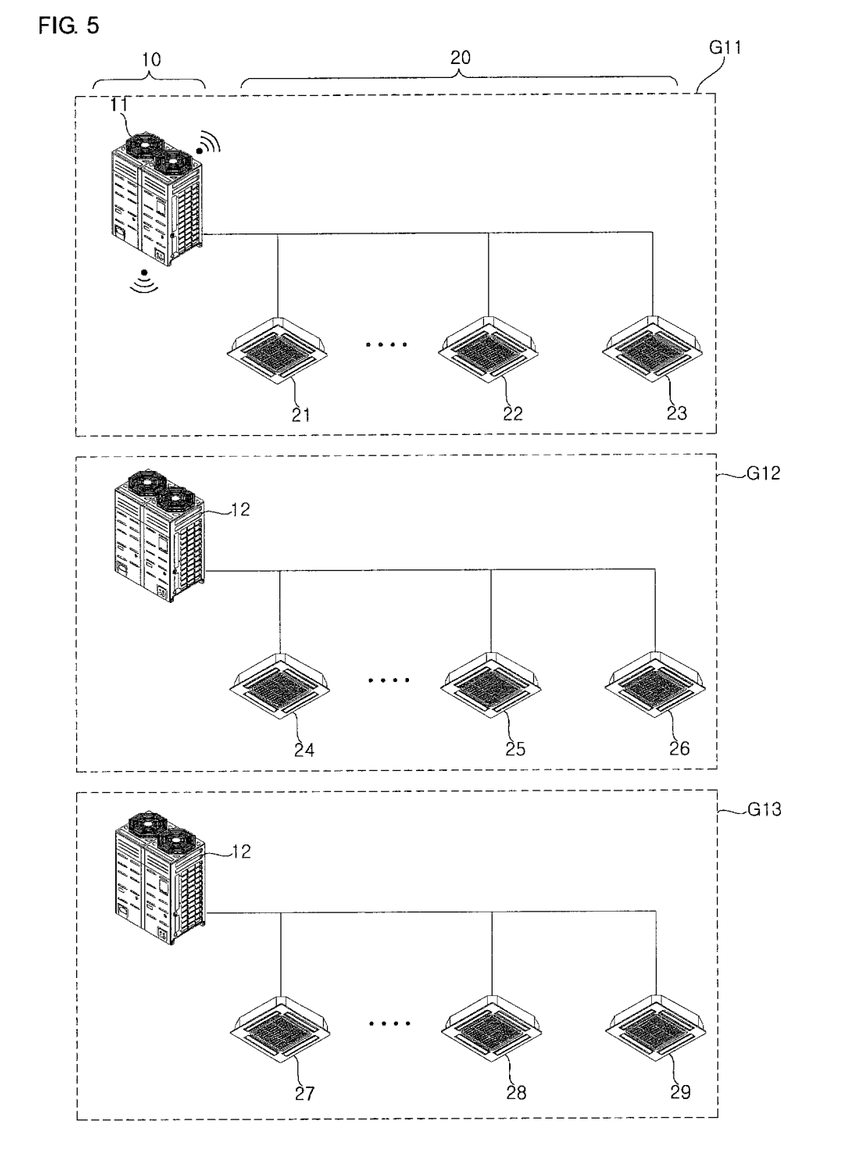
FIG. 5 is a diagram for explaining a group setting procedure using a channel by an air conditioner according to an embodiment of the present disclosure.

FIG. 5 is a diagram for explaining a group setting procedure using a channel by an air conditioner according to an embodiment of the present disclosure.

As described above with reference to FIG. 4, the first to third outdoor units operate sequentially to allocate an address through the basic channel to indoor units, from which a response signal is received, and set an additional channel for the indoor units, so that a group is set with respect to a plurality of indoor units, as shown in FIG. 5.

The first outdoor unit 11 sets a first group G11 with respect to the first to third indoor units 21 to 23 using a first channel ch01. The second outdoor unit 12 sets a second group G12 with respect to the fourth to sixth indoor units 24 to 26 using a second channel ch02. The third outdoor unit 13 sets a third group G13 with respect to the seventh to ninth indoor units 27 to 29 using a third channel ch03.

As groups are set according to a connected state of a refrigerant pipe, it is possible to prevent the fourth indoor unit 24 from operating in response to an operation signal transmitted by the first outdoor unit 11.

When the control device is connected, the control device may store information about a device included in each group and information about a channel in use, and may control each outdoor unit.

Figure 6:
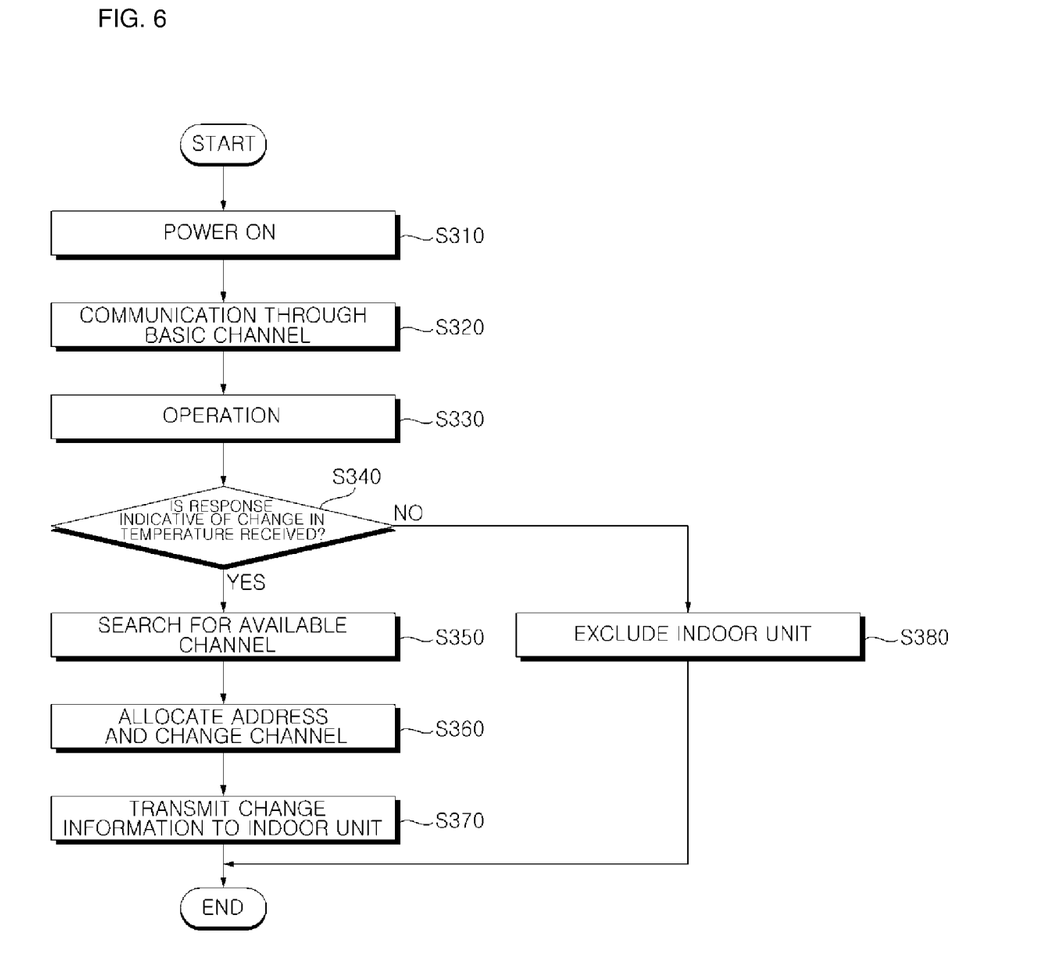
FIG. 6 is a flowchart of a control method for setting wireless communication by an outdoor unit according to an embodiment of the present disclosure.

FIG. 6 is a flowchart of a control method for setting wireless communication by an outdoor unit according to an embodiment of the present disclosure.

As illustrated in FIG. 6, as power is input, one of the plurality of outdoor units 10 starts to operate in S310.

The corresponding outdoor unit starts to perform communication using an initially set basic channel in S320.

In response to an input of an address setting key, the outdoor unit transmits an address setting signal using the basic channel and starts to operate in S330.

Meanwhile, a plurality of indoor units having received the address setting signal through the basic channel starts to operate in response to the address setting signal.

Within a set period of time after transmitting the address setting signal, the outdoor unit determines whether a response signal about temperature change is received in S340.

At this point, if the set period of time elapses, the outdoor unit transmits an operation stop signal so that the plurality of indoor units stops operating.

If a response signal is received from at least one indoor unit, the outdoor unit searches for an available channel in S350.

The outdoor unit allocates an address to an indoor unit from the response signal is received, transmits channel information about a found new channel to the indoor unit, and requests a channel change in S360.

After transmitting a signal to the indoor unit, the outdoor unit changes to the new channel, and performs communication through the new channel in S370. Once succeeding in communicating with the indoor unit through the new channel, the outdoor unit determines completion of the group setting procedure and thus finishes the setting procedure.

Meanwhile, if a response signal is not received from any indoor unit within the set period of time, such an indoor unit is excluded from group setting in S380. The outdoor unit allocates an address to only an indoor unit, from which a response signal has been received, and requests a channel change from the indoor unit, thereby unable so the outdoor unit does not communicates with other indoor units because a channel in use is changed.

Figure 7:
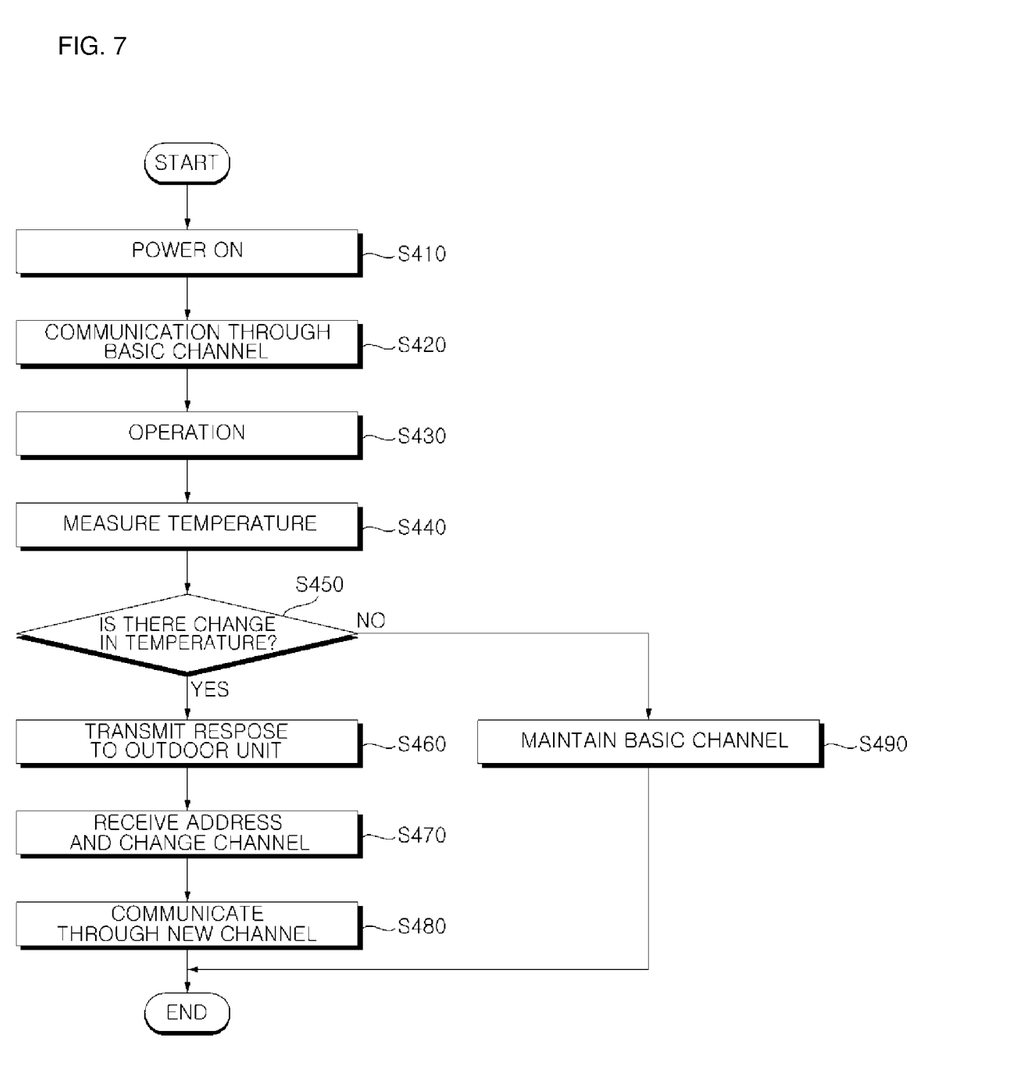
FIG. 7 is a flowchart of a control method for setting wireless communication by an indoor unit according to an embodiment of the present disclosure.

FIG. 7 is a flowchart of a control method for setting wireless communication by an indoor unit according to an embodiment of the present disclosure.

As illustrated in FIG. 7, one of the plurality of indoor units 20 turns on power and is maintained in an idle state in S410.

When an address setting start signal is received from an outdoor unit through the basic channel in S420, the corresponding indoor unit starts to operate in S430. The indoor unit operates with temperature and airflow which are predetermined to set an address.

After a predetermined period of time, the indoor unit measures temperature in S450 and compares the measured temperature with temperature measured before operation. Using a value of temperature measured by a temperature sensor, the indoor unit determines whether there is a change in temperature. The indoor unit determines whether there is a change in temperature, based on any one of indoor temperature, refrigerant pipe temperature, and heat exchanger temperature.

If there is a change in temperature, the indoor unit generates a response signal and transmits the response signal to the outdoor unit. If there is no change in temperature or the change in temperature is less than a set value, the indoor unit does not generate a response signal. In response to a signal from the outdoor unit, the indoor unit stops operating and enters an idle state.

If an address is allocated by the outdoor unit after transmission of the response signal, the indoor unit stores the allocated address and received channel information, and changes a communication channel from the basic channel to a new channel based on the channel information in response to a request for channel change in S470.

After changing the communication channel, the indoor unit communicates with the outdoor unit through the new channel in S480.

If there is no change in temperature, the indoor unit maintains the basic channel in S490.

Once communication with the outdoor unit is completed, the indoor unit finishes the setting procedure. In addition, when the setting procedure is completed, the indoor unit may be maintained in the idle state for a set period of time and then turn off power.

Figure 8:
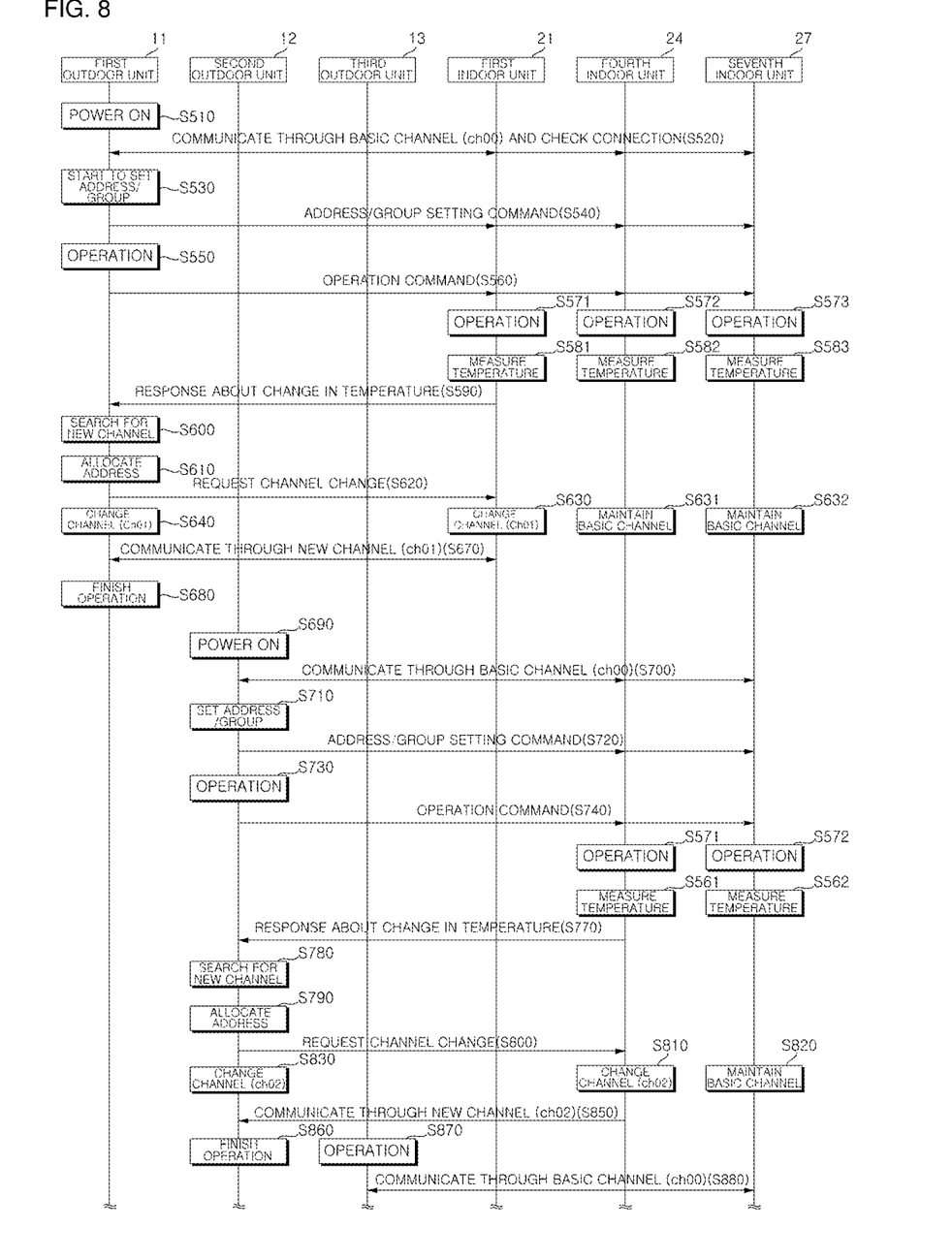
FIG. 8 is a flowchart illustrating a control flow for setting groups by an air conditioner according to an embodiment of the present disclosure.

FIG. 8 is a flowchart illustrating a control flow for setting groups by an air conditioner according to an embodiment of the present disclosure.

As illustrated in FIG. 8, an address allocating and group setting procedure will be described with the first to third outdoor units 11 to 13 and some of the plurality of indoor units, that is, first, fourth, and seventh indoor units 21, 24, and 27.

When power is input into the first outdoor unit 11 in S510, the plurality of outdoor units 10 starts to perform communication using an initially set basic channel ch00 and checks a connection state in S520.

In response to an input of an address setting key, the first outdoor unit transmits an address setting signal for address and group setting in S540. The address setting signal is transmitted to every indoor unit which uses the basic channel.

The first outdoor unit starts to operate S550, and transmits an operation command through the basic channel in S560. Accordingly, the first, fourth, and seventh indoor units start to operate in S571 to S573.

After a predetermined period of time elapses upon operation, each indoor unit measures temperature and determines whether there is a change in temperature in S581 to S583. As there is a change in temperature in the first indoor unit among the first, fourth, and seventh indoor units, the first indoor unit generates a response signal indicative of the change in temperature and transmits the response signal to the first outdoor unit in S590. Meanwhile, the fourth and seventh indoor units enter an idle state since there is no change in temperature.

When a set period of time elapses, the first outdoor unit stops operating and transmits an operation stop command. Accordingly, the first, fourth, and seventh indoor units stop operating. At this point, the set period of time is set to be longer than the predetermined period of time for indoor units.

As the response signal is received from the first indoor unit within the set period of time, the first outdoor unit searches for a new available channel in S600, allocates an address to the first indoor unit from which the response signal is received in S610, and requests a channel change so as to change to a first channel ch01 which is a new channel in S620. The first indoor unit stores the allocated address, and changes an existing communication channel to the first channel in response to the request for channel change in S630. The fourth and seventh indoor units maintain the basic channel in S631 and S632.

After requesting the channel change, the first outdoor unit changes the existing communication channel to the first channel ch01 which is a new channel in S640.

The first outdoor unit and the first indoor unit communicate with each other through the first channel in S670.

The second and third indoor units operate in the same manner as the first indoor unit does, and thus, the second and third indoor units are set to belong to a first group which uses the first channel.

As the address allocating procedure and the group setting procedure are completed, the first outdoor unit finishes operation and enters an idle state or turns off power in S680.

After the setting procedure by the first outdoor unit is completed, power is input into the second outdoor unit 12 in S690. If the second outdoor unit was in the idle state, the second outdoor unit is released from the idle state and then starts to operate.

The second outdoor unit 12 starts to perform communication using the initially set basic channel ch00 in S700.

In response to an input of an address setting key, the second outdoor unit generates an address setting signal for address and group setting and transmits the address setting signal in S720 and S730. The address setting signal is transmitted to every indoor unit which uses the basic channel. The address setting signal is received by the fourth and seventh indoor units.

The second outdoor unit starts to operate in 730, and transmits an operation command through the basic channel in S740. Accordingly, the fourth and seventh indoor units start to operate in S751 and S752.

After a predetermined period of time since operation, the fourth and seventh indoor units measure temperature in S761 and S762. If there is a change in temperature, the fourth indoor unit generates a response signal about the change in temperature and transmits the response signal to the second outdoor unit in S770. Meanwhile, the seventh indoor unit enters an idle state because there is no change in temperature.

When a set period of time elapses, the second outdoor unit stops operating and transmits an operation stop command. Accordingly, the fourth and seventh indoor units stop operating.

As the response signal is received from the fourth indoor unit within the set period of time, the second outdoor unit searches for a new available channel in S780 and allocates an address to the fourth indoor unit which transmitted the response signal in S790. Then, the second outdoor unit requests a channel change from the fourth indoor unit so as to change the existing channel into a second channel ch02 which is a found new channel in S800.

The second indoor unit stores the allocated address, and changes the existing channel into the second channel in response to the request for channel change in S810. The seventh indoor unit maintains the basic channel in S820.

After requesting the channel change, the second outdoor unit changes the existing channel into the second channel ch02 which is the found new channel in S830.

The second outdoor unit and the fourth indoor unit communicate with each other through the second channel ch02 in S850. The fifth and sixth indoor units are set to belong to a second group which uses the second channel ch02 and to which the fourth indoor unit is belonging.

As the address allocating procedure and group setting procedure are completed, the second outdoor unit finishes operation and enters an idle state or turns off power in S860.

Then, power is supplied to the third outdoor unit in S870, and the third outdoor unit performs communication using the basic channel in S880 and thus an address allocating and group setting procedure is performed with respect to the seventh indoor unit.

Thus, the present invention allows outdoor units and indoor units of an air conditioner to communicate, wherein the communication is performed on a unit basis of group which is automatically set according to a connection state of a refrigerant pipe. Groups are not manually set according to a connection state of a refrigerant pipe: instead, groups may be easily set by searching for an indoor unit connected to the same refrigerant pipe based on a change in temperature. In addition, a different channel is set for each group, thereby preventing interference with groups.

Although all elements constituting the embodiments of the present invention are described to be integrated into a single one or to be operated as a single one, the present invention is not necessarily limited to such embodiments. According to embodiments, all of the elements may be selectively integrated into one or more and be operated as one or more within the object and the scope of the present invention The preferred embodiments of the present invention have been disclosed for illustrative purposes, those skilled in the art will appreciate that various modifications, additions and substitutions are possible, without departing from the scope and spirit of the invention as disclosed in the accompanying claims.

An aspect of the present disclosure provides an air conditioner and a control method, and more particularly to an air conditioner, in which a plurality of units is connected wirelessly to receive and transmit data with respect to each other, and a control method thereof.

In an aspect, an air conditioner includes: a plurality of outdoor units; and a plurality of indoor units connected to one of the plurality of outdoor units via a refrigerant pipe, wherein the plurality of outdoor units transmits an address setting signal to the plurality of indoor units in a wireless communication method using an initially set basic channel, determines that an indoor unit from which a response signal is received among the plurality of indoor units is an indoor unit connected via the refrigerant pipe, sets a group with respect to the indoor unit, searches for a new available channel, and communicates with the indoor unit belonging to the group through the new channel.

The plurality of indoor units may start to operate in response the address setting signal, generate the response signal according to whether there is a change in temperature, and transmit the response signal.

The plurality of outdoor units may allocate an address to the indoor unit, from which the response signal is received, transmit channel information about the new channel to the indoor unit, and request a channel change.

An indoor unit having no change in temperature among the plurality of indoor units may maintain the basic channel.

In another aspect, a control method of an air conditioner includes: transmitting, by a first outdoor unit among a plurality of outdoor units, an address setting signal to a plurality of indoor units in a wireless communication method using an initially set basic channel; generating a response signal in response to the address setting signal and transmitting the response signal to the first outdoor unit by a first indoor unit among the plurality of indoor units; in response to the response signal, determining, by the first outdoor unit, that the first indoor unit is an indoor unit connected via a refrigerant pipe, and setting a first group; searching, by the first outdoor unit, for a new available channel; and communicating, by the first outdoor unit, with the first indoor unit using the new channel.

The method may further include starting, by the plurality of indoor unit, to operate in response to the address setting signal; and generating the response signal according to whether there is a change in temperature after a specific period of time, and transmitting the response signal.

When setting the first group, the first outdoor unit performs operations including: allocating an address to the first indoor unit and transmitting channel information about the new channel; and requesting the first indoor unit to change to the new channel.

The method may further include: starting, by a second outdoor unit among the plurality of outdoor units, to operate; transmitting, by the second outdoor unit, an address setting signal to a plurality of indoor units in a wireless communication method using an initially set basic channel; and setting a group with respect to an indoor unit from which a response signal is received among the plurality of indoor units.

As such, the air conditioner and the control method thereof according to the present disclosure allows a plurality of units in the air conditioner to receive and transmit data wirelessly, and sets groups by grouping units so that units are able to communicate with each other directly.

According to the present disclosure, groups can be easily set with respect to units connected via a pipe, and therefore, it is possible to reduce a time for setting wireless communication and make the communication setting accurate. The present invention allows units to communication using a different channel according to which group each unit belongs to, thereby preventing interference between groups and malfunction of units.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   a plurality of outdoor units that includes a first outdoor unit; and
   a plurality of indoor units connected to one of the plurality of outdoor units via a refrigerant pipe,
   wherein the first outdoor unit of the plurality of outdoor units is configured to:
      wirelessly transmit an address setting signal to the plurality of indoor units using a first channel,
      receive a response signal from at least one of the plurality of indoor units,
      determine that a first indoor unit, from which the response signal is received from among the plurality of indoor units, is an indoor unit coupled to the first outdoor unit via the refrigerant pipe,
      set a first group associated with the first indoor unit,
      search for a second channel for the set first group,
      allocate an address to the first indoor unit;
      provide, to the first indoor unit, channel information regarding the second channel;
      request a channel change of the first indoor unit to the second channel;
      communicate, wirelessly through the second channel, with at least the first indoor unit associated with the first group; and
      transmit a setting completion signal to another outdoor unit which is in an idle state,
   wherein a second outdoor unit of the plurality of outdoor units is configured to:
      remain in the idle state during the first outdoor unit setting the first group,
      when the completion signal is received at the second outdoor unit, start to operate, and
      wirelessly transmit the address setting signal to the plurality of indoor units using the first channel.

2. The air conditioner of claim 1, wherein the first indoor unit of the plurality of indoor units is configured to:
receive the address setting signal,
operate in response the address setting signal,
determine whether there is a specific change in temperature based on the operating of the first indoor unit, and
provide the response signal when the first indoor unit determines that there is a specific change in temperature.

3. The air conditioner of claim 1, wherein based on the channel information, the first indoor unit changes a communication channel from the first channel to the second channel.

4. The air conditioner of claim 1, wherein the plurality of outdoor units comprise the second outdoor unit, the second outdoor unit uses a third channel to communicate with indoor units belonging to a second group.

5. The air conditioner of claim 1, wherein a second indoor unit, from among the plurality of indoor units, is to maintain the first channel when the second indoor unit is determined to have no change in temperature.

6. A control method of an air conditioner having a plurality of outdoor units and a plurality of indoor units, comprising:
wirelessly transmitting, by a first outdoor unit from among the plurality of outdoor units, an address setting signal to the plurality of indoor units using an initially set channel;
remaining, via a second outdoor unit of the plurality of outdoor units, in an idle state;
in response to the address setting signal, providing a response signal from a first indoor unit, from among the plurality of indoor units, to the first outdoor unit;
in response to the response signal, determining, by the first outdoor unit, that the first indoor unit is coupled to the first outdoor unit via a refrigerant pipe, and setting a first group associated with the first indoor unit;
searching, by the first outdoor unit, for a new channel for the set first group;
allocating an address to the first indoor unit;
providing channel information regarding the new channel and requesting the first indoor unit to change to the new channel;
the first outdoor unit communicating, through the new channel, with the first indoor unit associated with the first group;
transmitting a setting completion signal to another unit including the second outdoor unit which is in the idle state;
starting to operate, by the second outdoor unit, from among the plurality of outdoor units using the initially set channel; and
wirelessly providing, by the second outdoor unit, an address setting signal to another plurality of indoor units using the initially set channel.

7. The control method of claim 6, further comprising:
in response to receiving the address setting signal, operating the first indoor unit;
determining whether there is a specific change in temperature based on the operating of the first indoor unit; and
providing the response signal when the first indoor unit determines that there is a specific change in temperature.

8. The control method of claim 7, further comprising:
maintaining the initially set channel by a specific indoor unit, from among the plurality of indoor units, having no determined change in temperature.

9. The control method of claim 6, further comprising:
changing, by the first indoor unit, a communication channel from the initially set channel to the new channel based on the channel information.

10. The control method of claim 6, further comprising:
setting a second group with respect to an indoor unit from which a response signal is received among the another plurality of indoor units.

11. The control method of claim 10, wherein the first group communicates using the new channel, and the second group communicates using another channel which is different than the new channel.

12. A control method of an air conditioner having a plurality of outdoor units and a plurality of indoor units, comprising:
providing an address setting signal from a first outdoor unit to the plurality of indoor units using a first channel;
remaining, via a second outdoor unit of the plurality of outdoor units, in an idle state;
in response to receiving the address setting signal, providing a response signal from a first indoor unit, from among the plurality of indoor units, to the first outdoor unit;
in response to receiving the response signal, determining, by the first outdoor unit, that the first indoor unit is coupled to the first outdoor unit via a refrigerant pipe, and setting a first group associated with the first indoor unit based on the determination;
searching for a second channel;
allocating an address to the first indoor unit;
providing channel information regarding the second channel and requesting the first indoor unit to change to the second channel;
the first outdoor unit communicating, through the second channel, with the first indoor unit associated with the first group;
transmitting a setting completion signal from the first outdoor unit to another outdoor unit including the second outdoor unit which is in the idle state;
operating the second outdoor unit from among the plurality of outdoor units; and
providing an address setting signal from the second outdoor unit to another plurality of indoor units using the first channel.

13. The control method of claim 12, further comprising:
in response to receiving the address setting signal, operating the first indoor unit;
determining whether there is a specific change in temperature based on the operating of the first indoor unit; and
providing the response signal when the first indoor unit determines that there is a specific change in temperature.

14. The control method of claim 13, further comprising:
maintaining the first channel for a specific indoor unit in which there is no determined specific change in temperature.

15. The control method of claim 12, wherein based on the channel information, the first indoor unit is to change a communication channel from the first channel to the second channel.

16. The control method of claim 12, further comprising:
setting a second group associated with an indoor unit from which a response signal is received among the another plurality of indoor units.

17. The control method of claim 16, wherein the first group communicates using the second channel, and the second group communicates using a third channel which is different than the second channel.

* * * * *